(12) United States Patent
Baxley et al.

(10) Patent No.: US 7,054,933 B2
(45) Date of Patent: May 30, 2006

(54) SELF-TUNING STATISTICAL RESOURCE ALLOCATION FOR MULTIPOINT NETWORK EVENTS

(75) Inventors: Warren Edward Baxley, Arvada, CO (US); Jeffrey Charles Adams, Lafayette, CO (US); Eric Jay Nylander, Morrison, CO (US); Douglas Earl Harbert, Denver, CO (US)

(73) Assignee: Polycom, Inc., Pleasanton, CA (US)

( * ) Notice: Subject to any disclaimer, the term of this patent is extended or adjusted under 35 U.S.C. 154(b) by 1015 days.

(21) Appl. No.: 09/812,971

(22) Filed: Mar. 19, 2001

(65) Prior Publication Data

US 2002/0165963 A1 Nov. 7, 2002

(51) Int. Cl.
*G06F 15/173* (2006.01)

(52) U.S. Cl. .............. 709/226; 709/222; 709/227; 370/260

(58) Field of Classification Search ........ 709/200, 709/204–205, 223, 226–229; 718/104, 102; 705/1, 7–8
See application file for complete search history.

(56) References Cited

U.S. PATENT DOCUMENTS 5,625,407 A * 4/1997 Biggs et al. ............. 348/14.11
5,819,043 A * 10/1998 Baugher et al. ............ 709/222
5,841,763 A * 11/1998 Leondires et al. .......... 370/260
5,903,637 A 5/1999 Hogan et al. ........... 379/203.01

(Continued)

FOREIGN PATENT DOCUMENTS

WO    WO 98/57485    12/1998

OTHER PUBLICATIONS

R. Rienema et al., "MCRS—A Multimedia Conference Reservation System," TENCON 99. Proceedings of the IEEE Region 10 Conference Cheju Island, South Korea, pp. 950-953, Sep. 15-17, 1999.

(Continued)

*Primary Examiner*—Wen-Tai Lin
(74) *Attorney, Agent, or Firm*—Wong, Cabello, Lutsch, Rutherford & Brucculeri, LLP

(57) ABSTRACT

A method for dynamically allocating MCU resources during a multipoint network event such as a conference call. The method determines the number of MCU resources to allocate for the start of the multipoint network event and then at each of a plurality of modeling intervals during the multipoint event adjusts the number of allocated MCU resources based upon actual inbound users. Self-tuning of the allocation of MCU resources for multipoint events occurs in advance of use by providing a look ahead allocation of resources based on what is likely to be needed in the future for a conferencing event. The number of multipoint events occurring within a tuning interval are counted. The number of MCU resources actually utilized during each multipoint event are accumulated and then a probability value is determined for future use of MCU resources for an upcoming multipoint event.

21 Claims, 8 Drawing Sheets

U.S. PATENT DOCUMENTS

| | | | |
|---|---|---|---|
| 5,933,417 A | 8/1999 | Rottoo | 370/260 |
| 5,951,644 A | 9/1999 | Creemer | |
| 5,995,608 A | 11/1999 | Detampel, Jr. et al. | |
| 6,081,513 A | 6/2000 | Roy | |
| 6,157,401 A | 12/2000 | Wiryaman | |
| 6,181,786 B1 | 1/2001 | Detampel, Jr. et al. | |
| 6,192,243 B1 | 2/2001 | Yang et al. | |
| 6,584,493 B1* | 6/2003 | Butler | 709/204 |
| 6,611,503 B1* | 8/2003 | Fitzgerald et al. | 370/260 |
| 2001/0009014 A1* | 7/2001 | Savage et al. | 709/204 |

OTHER PUBLICATIONS

O. Brandauer, "Materials Feed to Plastics Processing Machines," Industrial & Production Engineering, vol. 14, No. 4, pp.-68-69, 72 (1990).

Hine et al., "Combining Client Knowledge and Resource Dependencies for Improved World Wide Web Performance," Proceedings of the INET '98 Conference, Geneva, Switzerland, 1998.

\* cited by examiner

| Modeling Table | | | | | |
|---|---|---|---|---|---|
| Modeling Interval $j$ | 1 | 2 | 3 | ... | $j$ |
| Probability $P_j$ | $P_1$ | $P_2$ | $P_3$ | ... | $P_j$ |

Figure 4

| Accumulation Table | | | |
|---|---|---|---|
| Event Counter | Resource Accumulators $\left(R_j\right)$ | | |
| w | $R_1$ | $R_2$ | $R_3$ |

Figure 5

| Modeling Table | | | | |
|---|---|---|---|---|
| Modeling Interval $j$ | | 1 | 2 | 3 |
| Probability $P_j$ | | $P_1$ | $P_2$ | $P_3$ |

Figure 7

| Tuning Table | | | | |
| --- | --- | --- | --- | --- |
| | | Normalized Resource Accumulations $\left(\overline{R}_{i,j}\right)$ | | |
| Tuning Interval ($i$) | Event Counter ($w_i$) | $\overline{R}_{i,1}$ | $\overline{R}_{i,2}$ | $\overline{R}_{i,3}$ |
| 1 | $w_1$ | $\overline{R}_{1,1}$ | $\overline{R}_{1,2}$ | $\overline{R}_{1,3}$ |
| 2 | $w_2$ | $\overline{R}_{2,1}$ | $\overline{R}_{2,2}$ | $\overline{R}_{2,3}$ |
| 3 | $w_3$ | $\overline{R}_{3,1}$ | $\overline{R}_{3,2}$ | $\overline{R}_{3,3}$ |

Figure 6

SELF-TUNING STATISTICAL RESOURCE ALLOCATION FOR MULTIPOINT NETWORK EVENTS

BACKGROUND OF THE INVENTION

1. Field of the Invention

The present invention relates to the allocation of Multipoint Control Unit (MCU) ports or media server port resources for conferencing or other multipoint applications including audio teleconferencing and video conferencing that require the use of scarce MCU ports or other resources.

2. Statement of the Problem

Current state of the art multipoint conferencing applications or systems require advance knowledge of conferencing events so that scarce port resources can be allocated or reserved for the use of that event. Many applications or systems require that the user actively reserve a certain number of ports for a specific duration at a specific time. For example, setting up a conference call for twelve participants at 3:00 p.m. on Friday. Other, more advanced, applications or systems allow for ad-hoc, or unreserved, events to occur on a capacity-permitting basis, but even these applications or systems allocate a fixed number of port resources to the event for the entire duration of the event. For example, a call-in conference with an expected fifty participants at 3:00 p.m. on Friday. In both cases, this fixed number of port resources is nearly always greater than the number of ports that will actually be utilized in the event.

This conventional practice leads conferencing service providers to overbook their port capacity (sometimes dramatically) in order to accommodate the reservation of ports for the exclusive use of a particular event, where many of the reserved ports will not in fact be utilized by that event. "Overbooking" ports may result in a 50% or greater port utilization inefficiency during peak usage periods. This inefficiency dramatically increases the cost of offering multipoint services because it requires an excess of both expensive hardware capacity and expensive telephony or other network termination to that hardware.

A need exists to more efficiently utilize MCU ports for media server port resources for conferencing or other multipoint applications especially during peak usage periods. A need exists to more efficiently utilize expensive hardware capacity, telephony, and other network termination hardware. A system is needed to provide look-ahead allocation of resources based on what is likely to be needed in the future for a conferencing event. Such allocation should be adjusted over time with no prior knowledge of the event. A need also exists for such an allocation to use self-tuning statistics, to provide a configurable allocation, and configurable event start parameters.

SUMMARY OF THE INVENTION

The present invention solves the above problem by providing a method for dynamically allocating MCU resources during a multipoint network event. This occurs by determining the number of MCU resources to allocate at the start of the multipoint network event and then at each of a plurality of modeling intervals during the multipoint event adjusting the number of allocated MCU resources based upon the number of actual inbound users. This method more efficiently utilizes MCU ports for a multipoint network event by allocating less than or equal to the maximum number of ports to start and then continually adjusting the number allocated based upon actual inbound users to the event.

A further method is presented for self-tuning the allocation of MCU resources for multipoint events in advance of use thereby providing a look ahead allocation of resources based on what is likely to be needed in the future for a multipoint network event. This is accomplished by counting the number of multipoint events that have been accumulated within at least one tuning interval, accumulating a number of MCU resources actually utilized during each multipoint event in each tuning interval, and then determining a probability value for future use of MCU resources for an upcoming multipoint event based on the steps of counting and accumulating. In one embodiment, the number of resources are accumulated during modeling intervals of each multipoint event. The present invention provides allocation of MCU resources based on self-tuning statistics, provides configurable allocations, and provides a degree of confidence in the start parameters.

BRIEF DESCRIPTION OF THE DRAWINGS

FIG. 4 is a generalized modeling table of the present invention.

FIG. 5 is an example of an accumulation table of the present invention.

FIG. 6 is an example of a tuning table of the present invention.

FIG. 7 is an example of a modeling table of the present invention.

DETAILED DESCRIPTION OF THE INVENTION

1. Overview.

The present invention provides a time-varying resource allocation algorithm that closely tracks actual resource usage during an event and periodically adjusts the number of resources allocated to that event as the event proceeds. For most multipoint events like conferencing, this means that relatively more ports must be allocated at the beginning of an event, and that this allocation can decrease during the event as the statistical probability of users joining the event decreases. An event may be an audio teleconferencing event, a video conferencing event, or any multipoint event using resources such as MCU ports or media server port resources.

The resource algorithm of the present invention has the additional capability of self-tuning its statistical model based on actual behavior patterns of users of the system over time. This capability ensures that the model is continuously adjusted to yield the maximum possible resource utilization efficiency. This method is also used in an application where exact statistical behavior of the population of users is not known prior to system installation.

The method of the present invention uses the following definitions:

(a) Minimum Start Resources ($R_{SM}$): The lowest number of resources that must be unallocated in order to allocate space for a new event.

(b) Maximum Resources ($R_{MAX}$): The largest number of resources that can be utilized by a particular event. This value can vary from event to event, and is usually specified either through stored subscription information or as a parameter included with the signaling for the inbound users.

(c) Start Resource Percentage ($R_{SP}$): The percentage of "Maximum Resources" that must be unallocated in order to allocate space for a new event. This will also be the number of resources allocated to the new event for the first modeling interval.

(d) Modeling Interval (j): The time interval in between allocated resource adjustments such as, for example, one minute.

(e) Tuning Interval (i): The time interval between tuning adjustments to the statistical modeling table such as, for example, one day.

(f) Confidence Factor (S): A decimal value between zero and one that is used to configure the behavior of the resource allocation algorithm. In general, larger "confidence factors" will result in more resources allocated to an event for any given "modeling interval."

With these definitions in place and with other definitions to be set forth, the invention and its several embodiments are discussed next.

2. Event Initiation

Figure 1:
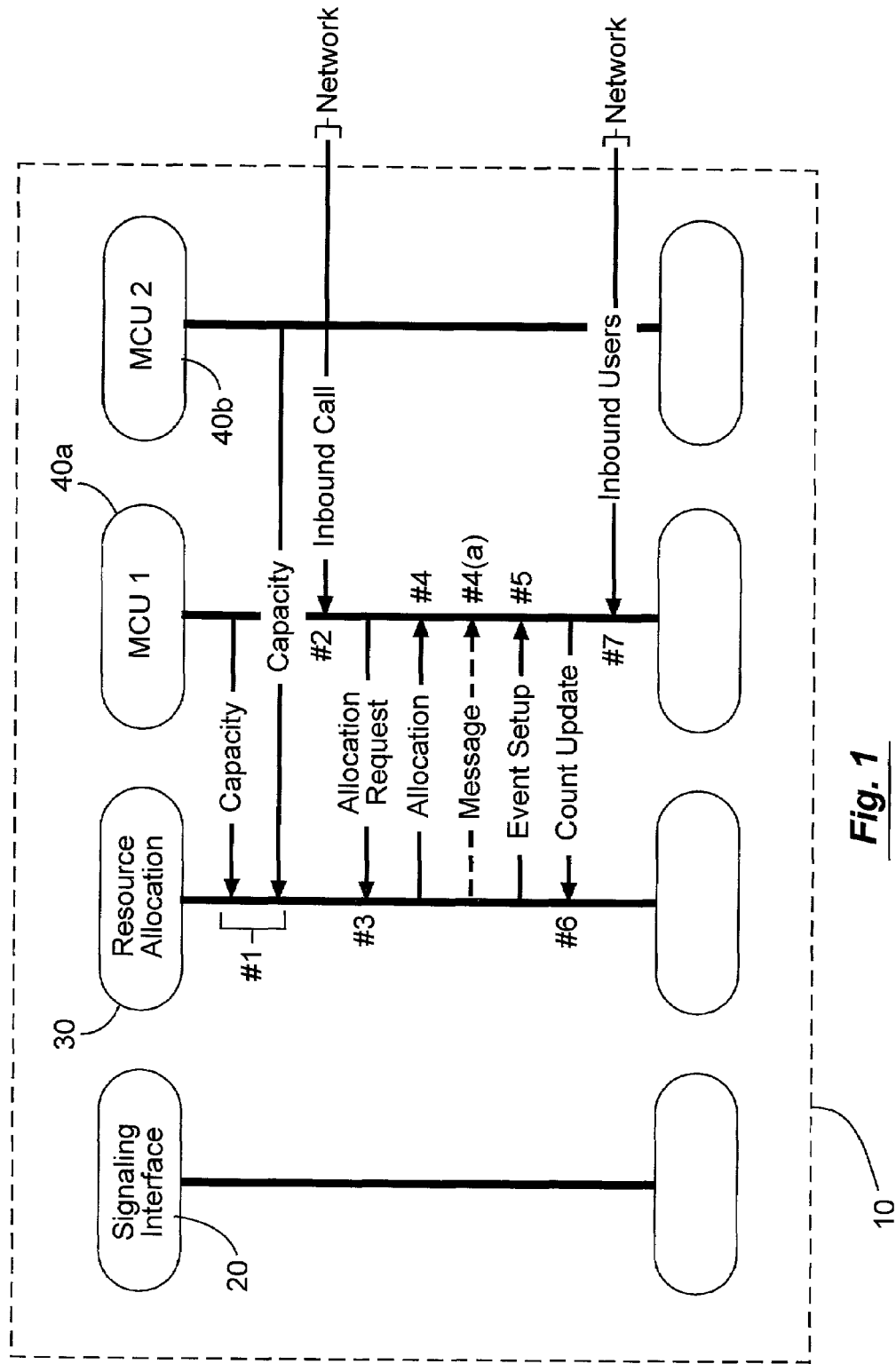
FIG. 1 is a timing flow sequence chart showing the operation of an MCU-originated event according to the teachings of the present invention.
Figure 2:
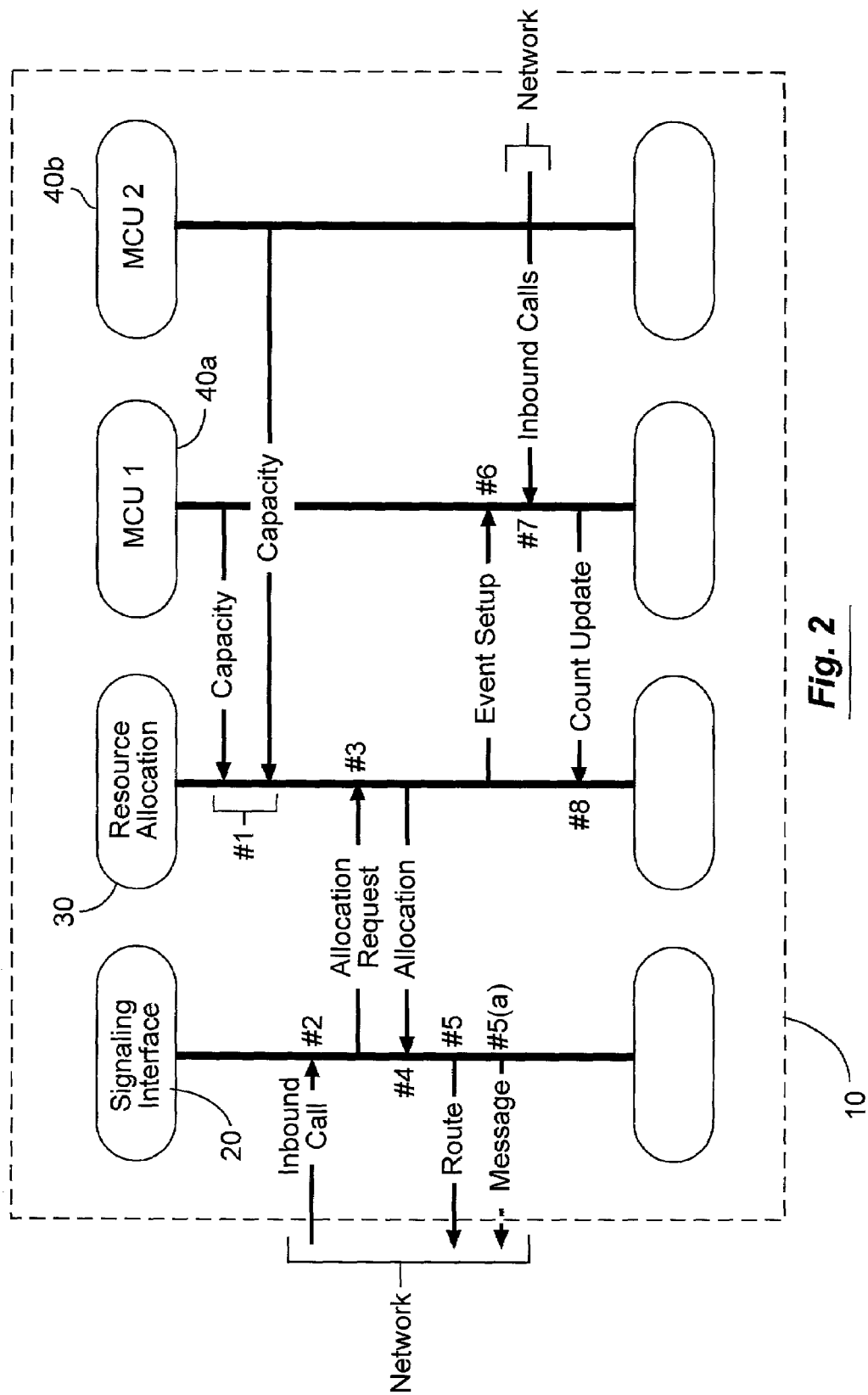
FIG. 2 is a timing flow sequence chart showing the operation of a routable signaling-initiated event according to the teachings of the present invention.
Figure 3:
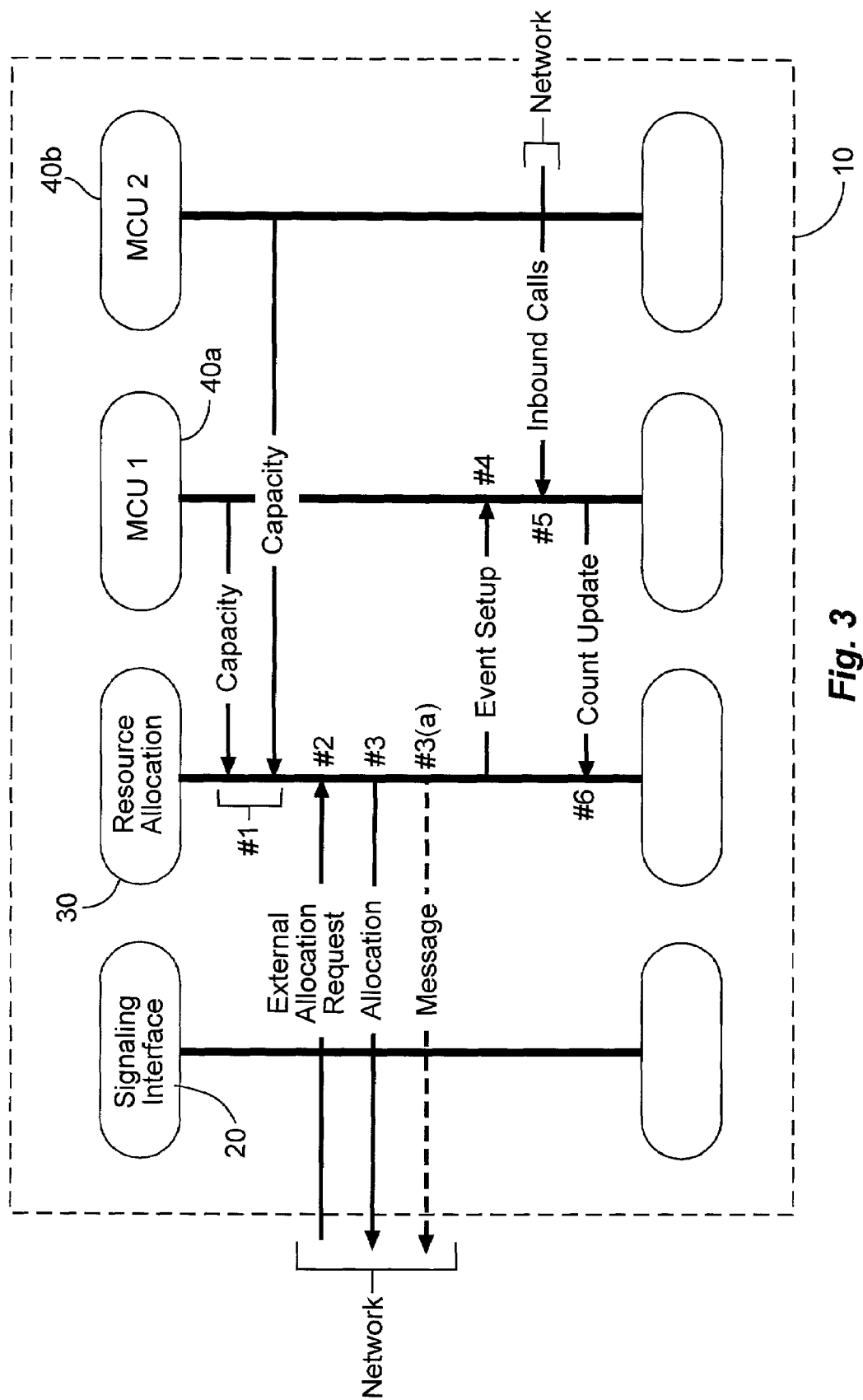
FIG. 3 is a timing flow sequence chart showing the operation of an externally-initiated event according to the teachings of the present invention.

The beginning of an ad-hoc event occurs when the first user initiates, through a telephone call or other means, contact with the application or system for the purpose of joining or creating an event. The application or system may become aware of the user's request for resources through the appearance of the user as a connection to a particular MCU (case 1 as shown in FIG. 1), through a common-channel signaling event to a central resource allocation controller (case 2 as shown in FIG. 2), or through some other externally initiated resource allocation request (case 3 as shown in FIG. 3) (e.g., direction to start an event and allocate resources from an Internet web page). Whatever the case, this first request to start an event and allocate resources to that event is called an "allocation request."

Prior to any allocation requests, each MCU must conventionally inform the resource allocation process of its available capacity. This action typically occurs when the resource allocation software is initialized, or when new MCU resources are made available for use by the application or system. MCUs, resource allocation software, and allocation requests are conventional and comprise a number of different known approaches.

When an allocation request is received, the resource allocation process will check the available capacity on one or more MCUs and apply the resource allocation algorithm of the present invention to determine whether an event can be started and how many resources to allocate to that event. The algorithm of the present invention will multiply the "Configurable Start Resource Percentage" ($R_{SP}$) by the "Maximum Resources" ($R_{MAX}$) value associated with the event, and limit the result by the value of "Configurable Minimum Start Resources" ($R_{SM}$). The result of this calculation, rounded up to the nearest whole number of resources, will equal the number of resources that is both required for the event to start and to use as the initial resource allocation for the event. Stated mathematically:

$$R=[(R_{MAX})(R_{SP})]R_{SM} \qquad \text{Formula I}$$

For example, where "Configurable Start Resource Percentage"=$R_{SP}$=0.80, "Maximum Resources" (for this event) $R_{MAX}$=10, and "Configurable Minimum Start Resources" $R_{SM}$=5:

$R=[(10)(0.80)]_5$=8 resources required to start the event This illustrates the operation of the present invention in starting a multipoint network event with less (i.e., 8 ports) than the requested maximum allocation (i.e., 10 ports). The value of R can be less than or equal to the maximum number of resources.

If an MCU exists with at least enough unallocated resource capacity to allow the initial resource allocation calculated above, then that number of resources will be allocated on that MCU, and inbound users will be directed automatically (except in Case 1 where the user is already on the MCU) to that MCU for participation in the event. The allocation of resources is debited accordingly from the available (unallocated) capacity of the selected MCU.

This process is depicted graphically as timing flow charts in FIGS. 1, 2, and 3. FIG. 1 depicts Case 1 where the application or system first becomes aware of the event through a direct inbound call to a particular MCU, while FIG. 2 depicts Case 2 where the application or system first becomes aware of the event through a common channel signaling (e.g. SS7, Session Initiation Protocol (SIP), or other) message from the network. See U.S. Pat. Nos. 5,995, 608 and 6,181,786 "Method and Apparatus for On-Demand Conferencing" for one embodiment of this case. FIG. 3 depicts Case 3 where an externally originated control signal is used to request resource allocation to an event, independently from the first use of those resources. In all three cases, the MCUs register their presence and provide their capacity to the resource allocation process 30 in step #1. Some amount of time passes, and then a user initiates the event in one of the three preferred ways (i.e., Case 1, Case 2, or Case 3) under the teachings of the present invention.

In FIGS. 1, 2, and 3, the system 10 includes the following components: a common channel signaling interface 20, resource allocation process 30, and a plurality of MCUs 40. The hardware and software steps associated with these system components 20, 30 and 40 are all conventional except the software methods as taught herein.

In Case 1 of the MCU-Originated Event as shown in FIG. 1, the receipt of an inbound call (step #2) to the MCU 40a in the system 10 triggers a resource allocation request (step #3) to the resource allocation process 30. After calculating the number of resources required through the calculation described above, the resource allocation process 30 determines (step #4) whether sufficient capacity exists on the originating MCU 40a to support the event. If sufficient capacity does not exist for the requested event, this fact will be transmitted (step #4a) to the MCU 40a so that it can handle the incoming caller appropriately, which usually means playing a message and disconnecting the caller in the inbound call. If sufficient capacity exists according to the Formula I calculation above, the resource allocation process 30 (or other conventional software process within the system) will respond (step #5) to the originating MCU 40a with a setup message that describes the event and includes the number of resources (R) allocated to start that event. The contents of this setup message and the mechanism by which it is communicated to and handled by the MCU 40a are conventional. Once the call is associated with its particular event, the MCU 40a informs (step #6) the resource allocation process 30 that R number of the allocated resources is in use through a count update message thereby debiting the available MCU capacity. All inbound users of the scheduled event are directed (step #7) to the allocated MCU 40a resources for participation in the event.

Case 2 of the common channel signaling initiated event is shown in FIG. 2. The inbound call (step #2) is first presented to the application or system 10 through a common channel signaling interface 20. This interface process 20 conveys the allocation request (step #3) to the resource allocation process 30, which will perform the Formula I calculation described above to determine (step #4) the required number of resources for this event to be started. The resource allocation process 30 will then check this value against the available resource capacity of all registered MCUs 40, and select one MCU 40 with sufficient unallocated capacity to host the event. This selection process is conventional and U.S. Pat. Nos. 5,995,608 and 6,181,786 "Method and Apparatus for On-Demand Conferencing" describes MCU selection methods, including but not limited to "level-loading" of events and "least-cost" routing of calls. If none of the MCUs 40 of which the resource allocation process is aware has sufficient unallocated capacity to host the requested event, then a common channel signaling message will be conveyed (step #5a) via the common channel signaling interface 20 back to the network so that the inbound call can be handled appropriately. If resources are sufficient, an MCU selection is made (in FIG. 2, MCU1) and a common channel signaling message is conveyed (step #5) via the common channel signaling interface back to the network. This message includes destination routing instructions that identify the selected MCU1 as the destination for the call, as well as signaling information that will allow the call to identify itself to the selected MCU1. While the call is routed through the network, the resource allocation process conveys (step #6) the event setup message to the MCU, which receives the inbound calls (step #7) from the participants some small amount of time later. When a call is received and associated with its particular event, the MCU1 informs the resource allocation process 30 that one of the allocated resources is in use (step #8) through a count update message thereby debiting the available MCU capacity by the value of one.

Case 3 of the externally initiated event request is shown in FIG. 3. The request (step #2) for resource allocation is made through some conventional external mechanism that is not necessarily associated with an inbound call that will consume one of the requested resources. For example, a request may be received conventionally from an Internet web page or other interface to start a particular conference and dial out to a list of participants. The request to start the conference represents an allocation request from an allocation requestor as defined under the teachings of this present invention. When the external allocation request is made (step #2), the resource allocation process 30 will perform the Formula I calculation described above and identify an MCU 40 through a routing process similar to that used in Case 2 of FIG. 2. As before, if sufficient capacity is not available a message is delivered (step #3a) informing the external requestor that MCU capacity is not available. If available, the resource allocation process 30 will then convey (step #3) to the requestor a message indicating that resources have been allocated for the requested event. In the same manner as in the above cases, the resource allocation (or other) process will then convey (step #4) an event start message to the selected MCU 40 (i.e., MCU1 in FIG. 3). Some time later, when and if an inbound or outbound call (step #5) is associated with this event, MCU1 will inform (step #6) the resource allocation process 30 that one of the allocated resources is in use through a count update message and thereby debiting the available MCU capacity by one.

In all three cases, subsequent to the call or external message that initiated the event, inbound or outbound calls that consume one of the allocated resources will be reported by the MCU 40 via a count update message to the resource allocation process 30 so that it can maintain an accurate count of resources actually expended by debiting its allocation for that event.

In summary, the above sets forth a method for allocating MCU resources for a multipoint network event. An allocation request is preferably received from one of three case examples. It is to be expressly understood that how the allocation request is received can occur by one of the three approaches discussed above, but the invention is not so limited. The request at least contains the number for the maximum MCU resources for the multipoint network event. It also includes other conventional information such as time, etc. The present invention determines, according to Formula I, the number of MCU resources to be allocated for the start of the multipoint network event which number is less than or equal to the maximum MCU resources requested. This allows the event to generally start out with a lower number of MCU resources in order to allow more efficient use of the available MCU resources. Formula I is a preferred algorithm but the present invention is not limited to use of this precise algorithm.

3. Time Varying Resource Allocation During an Event

During an event (e.g., an audio conference call), the resource allocation process 30 applies a statistics-based algorithm of the present invention every "modeling interval (j)" to recalculate the number of resources that should be allocated to the event for the next "modeling interval (j)." A preferred modeling interval (j) is one minute although any suitable such time interval could be used. It is to be understood that while the preferred modeling interval is a constant time interval that the invention is not limited to constant time intervals. As an alternative, the time interval value can change based on age of the event so that the time intervals are shorter at the beginning of the call and become larger as the event ages. This statistics-based algorithm is distinct from Formula I used to allocate resources at the start of the event.

The time-varying resource allocation algorithm is supported by a statistical modeling table that models the behavior of the arrival of event participants over time as shown in FIG. 4. This one-dimensional table of values has as its entering argument the age of the event in terms of a multiple of "modeling intervals (j)." The Modeling Table of FIG. 4 is composed of probability values $P_j$ between zero and one for each "modeling interval (j)." These values represent the probability that an event participant will arrive to consume one of the allocated resources during the next "modeling interval." This table of values can be statically stored on the machine running the resource allocation process 30, it can also be dynamically self-tuning as described later, or both.

The calculation performed by the resource allocation process 30 for each MCU for every "modeling interval (j)" is as follows:

$$R_j = \left[ \sum_{events} \left( \left( R_{actual} + \frac{Pj}{1-S} \right) \Big| R_{MAX} \right) \right] \Big|_{(\Sigma_{events} R_{actual})+1} \quad \text{Formula II}$$

Where the $R_{actual}$ value is the number of resources actually in use in a particular event, the probability value ($P_j$) comes from the modeling table described above for FIG. 4. The "Confidence Factor" (S) is a configurable factor which may be set by the system administrator for resource allocation software 30. The higher the value of S, the more aggressively resources (e.g., ports) are allocated and the lower the value, the more closely the allocation follows actual port usage. The value of "Maximum Resources" ($R_{MAX}$) is applied as an upper limit. The resources allocated to each of the "events" running on an MCU are summed together and rounded up to the nearest whole number of resources to arrive at an overall result for allocated resources for each MCU 40. There is a separate summation for each MCU in the system —separate values of $R_{actual}$ and $R_j$.

For example, where $R_{MAX}=10$, $S=0.98$, and with only one event active:

1. Early in the Event.

When few participants are present (e.g., $R_{actual}=1$), the probability ($P_j=0.4$) of new participants arriving is high and, in the case of one event, then Formula II results in:

$$R_j = \left[ \left( 1 + \frac{0.4}{1-0.98} \right) \Big| 10 \right] \Big| 1+1$$

$$R_j = [(1+20) | 10] |_2$$

$$R_j = [10] |_2$$

$$R_j = 10$$

In this case, the "max resources" upper limit prevents the allocated resources, which would be 21 otherwise, from exceeding the maximum for this event. The above represents only a single event for illustration purposes and, in operation, the lower limit (i.e., +1) would be applied by summing actual resources over all events.

2. Later in the Same Event.

Where($R_{actual}=5$ and $P_j=0.05$), and, in the case of one event, then:

$$R_j = \left[ \left( 5 + \frac{0.05}{1-0.98} \right) \Big| 10 \right] \Big|_{5+1}$$

$$R_j = [(5+2.5) | 10] |_6$$

$$R_j = [7.5] |_6$$

$$R_j = 7.5$$

The resource allocation process sums the individual allocation results from each of the events running on a MCU to arrive at a total allocation pool for each MCU, so fractional resources are permitted at the event level; rounding to whole resources occurs after the aggregation of results from all MCU events. The above represents only a single event for illustration purposes and, in operation, the lower limit (i.e., +1) would be applied by summing actual resources over all events.

3. Even Later in the Event.

Where ($R_{actual}=5$ and $P_j=0.001$), and in the case of one event then the likelihood of adding new resources is very low:

$$R_j = \left[ \left( 5 + \frac{0.001}{1-0.98} \right) \Big| 10 \right] \Big|_{5+1}$$

$$R_j = [(5+0.05) | 10] |_6$$

$$R_j = [5.05] |_6$$

$$R_j = 6$$

In this case, the lower allocation limit of 6 prevents the number of allocated resources $R_j$, which would be 5.05 otherwise, from falling below the actual resources in use plus one. The above represents only a single event for illustration purposes and, in operation, the lower limit (i.e., +1) would be applied by summing actual resources over all events.

The examples set forth above are not intended to limit the application of Formula II under the teachings of the present invention. Rather, the examples illustrate the operation of Formula II for a single event. What has been illustrated above is the situation where the confidence factor S at the different modeling time intervals U) is static (in the examples, S=0.98).

What has been described above is a method under the teachings of the present invention for time varying the allocation of MCU resources during a multipoint network event. This method process determines the number of MCU resources to allocate for the start of the multipoint network event as discussed above with respect to Formula I or with any other algorithm for determining the number of resources to allocate for the start of such a multipoint network event. During the actual multipoint network event, the method of the present invention at each of a plurality of modeling intervals (j) adjusts the number of allocated MCU resources based on users actually in the multipoint network event at that time. This time varying allocation or dynamic allocation allows the method and system of the present invention to rapidly adjust the allocation of MCU resources to accommodate incoming users. In the preferred embodiment, this occurs by the calculation of Formula II but it is to be expressly understood that any suitable modeling algorithm could be used to accomplish the time varying allocation and that while the modeling intervals are constant such as at one-second or one-minute intervals, any suitable timing could be utilized. It is to be understood that in a variation of the present invention that the modeling interval (j) could be very short such as about one second or less so as to appear to be continuous.

4. Self-Tuning Statistics

The probability values contained in the Modeling Table that is utilized by the resource allocation algorithm during its time-varying allocation calculations will vary with different types of events and different populations of event users. One of the functions of the resource allocation process 30 of the present invention is to continually accumulate statistical data that describes the behavior of a population of users with respect to a particular application or system where this method of resource allocation is utilized, and to dynamically modify the probability values P in its Modeling Table periodically where appropriate.

The self-tuning technique of the present invention involves the accumulation of allocation values for each "modeling interval (j)" within a "tuning interval (i)," along with a count (w) of the number of accumulated events within the "tuning interval" for weighting purposes. The modeling interval (j) is short such as one minute and the tuning interval (i) is long such as one day. Whatever actual times are used the tuning interval is much greater than the modeling interval such as at least by two magnitudes greater. The resource allocation process maintains a table of these values and adjusts the Modeling Table at the end of each "tuning interval" based on the weight of the events in the tuning interval relative to the weight of all of the events in the Modeling Table.

The self-tuning process of the present invention involves three tables: the Accumulation Table of FIG. 5, the Tuning Table of FIG. 6, and the Modeling Table of FIG. 7. Each of these tables is described in detail below.

(a) The Accumulation Table

The Accumulation Table shown in FIG. 5 is a one-dimensional table whose first column contains a count (w) of the number of events that have been accumulated within the tuning interval (i) for weighting purposes. Subsequent columns contain accumulations ($R_j$) for each "modeling interval" of the number of resources that have become utilized during that interval. For example, FIG. 5 represents a simple accumulation table for a system using only three modeling intervals (j). Note that practical applications of this method typically use a much larger number of "modeling intervals"; this table is intended to be illustrative of the method. For example, a 30-minute conferencing event could have 30 modeling intervals of one minute each.

(b) The Tuning Table

The Tuning Table shown in FIG. 6 is a two-dimensional table with each row representing a "tuning interval (i)" and columns containing data for each "modeling interval (j)." For example, FIG. 6 represents a simple tuning table for a system using the three "modeling intervals (j)" from the example above for three "tuning intervals" (i).

Calculation of normalized resource allocations, $\overline{R}_{i,j}$, is according to the following formula: where the $R_j$ values come from the Accumulation Table of FIG. 5:

$$\overline{R_{i,j}} = \frac{R_j}{\sum_{j=1}^{n} R_j} \qquad \text{Formula III}$$

Where $\overline{R}_{i,j}$=Normalized Resource Accumulations
n=the total number of modeling intervals used (c) The Modeling Table The Modeling Table of FIG. 7 is a one-dimensional table that contains, for each "modeling interval," a value ($P_j$) representing the number of new resources that are likely to be needed during that modeling interval (j) for each event. The Modeling Table is the source of the probability values ($P_j$) used as described above for Formula II. The example below continues the above case for a system using only three "modeling intervals (j)." Calculation of probability values is according to the following formula, applied to values ($w_i$) and ($\overline{R}_{i,j}$) in the Tuning Table:

$$P_j = \frac{\sum_{i=1}^{m}(w_i)(\overline{R}_{i,j})}{\sum_{i=1}^{m} w_i} \qquad \text{Formula IV}$$

Where m=the number of tuning intervals used and $w_i$=the weight factor for each tuning interval.

(d) Self-Tuning Process

Figure 8:
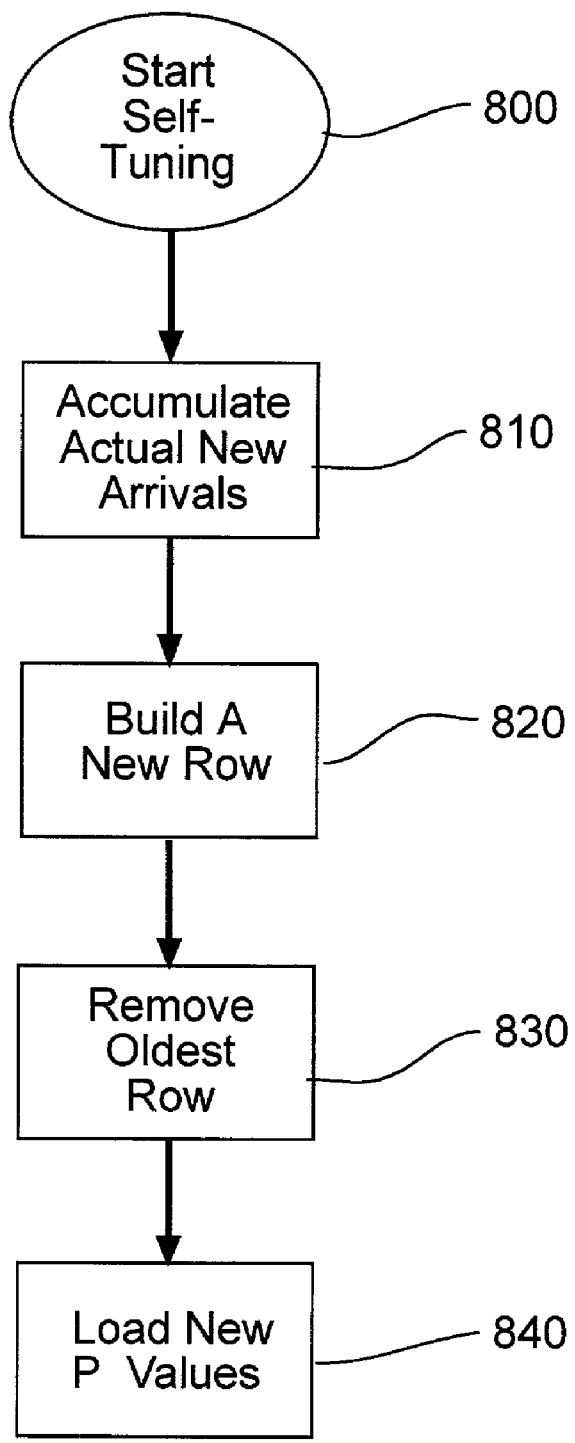
FIG. 8 is an overview of the self-tuning process of the present invention.

What follows next is the self-tuning process 800 of the present invention based upon the tables of FIGS. 5–7 and shown in FIG. 8.

Step 1: Accumulate 810 Actual New Arrivals for each "Modeling Interval (j)"

Whenever a new event starts, the resource management process 30 will increment the counter (w) in the Accumulation Table that keeps track of the total number of events that have started during the current "tuning interval (i)". During an event, whenever a resource is expended on a new event participant, the resource management process will increment the appropriate "modeling interval (j)" counter in the Accumulation Table.

Step 2: At the End of the "tuning interval (i)," Build 820 a New Row in the Tuning Table When the end of a "tuning interval (i)" is reached, the resource management process 30 will calculate (Formula III) a new row of normalized resource accumulations, $\overline{R}_{i,j}$, from the values in the Accumulation Table. This new row is then added to the Tuning Table so that its values will be taken into account during the next calculation of Modeling Table values.

Step 3: Remove 830 the Oldest Row in the Tuning Table

Once the new row of Tuning Table values has been added, the oldest row is removed. This allows the system to consider only the most recent "tuning intervals (i)" in the Formula IV calculation of P values for the Modeling Table. The number of "tuning intervals (i)" retained in the Tuning Table is chosen so as to achieve a desired modeling "inertia," that is, to balance the competing desires of having the system performance adapt reasonably quickly to changing usage patterns yet avoid drastic changes in system behavior that might be caused by statistically aberrant data in any one "tuning interval (i)." A useful range of tuning intervals (j) would be 15 to 90, assuming that the tuning intervals (j) are days.

Step 4: Load 840 Modeling Table with New P Values

Finally, the Modeling Table is loaded with newly calculated (Formula IV) Pj values. These new values reflect the contribution of the new row of Tuning Table data and no longer reflect the contribution of the oldest row of Tuning Table data that was removed in step 3.

This is a preferred approach for self-tuning the value of $P_j$ and it is to be expressly understood that any suitable approach for performing the self-tuning function could be utilized under the teachings of the present invention and that the present invention is not to be limited to this specific approach.

In summary, the self-tuning method of the present invention establishes tuning intervals such as at least daily intervals wherein the number of multipoint network events are counted. The MCU resources actually utilized during each multipoint network event are accumulated. The resource allocations are normalized based upon the Formula III calculation. Then a probability value for future use of MCU resources for an upcoming multipoint network event is calculated according to Formula IV. These formulas are preferred, but the present invention is not limited to these formulas. Any suitable statistical method can be used to provide self-tuning of MCU resource utilization.

5. Summary of Method.

Figure 9:
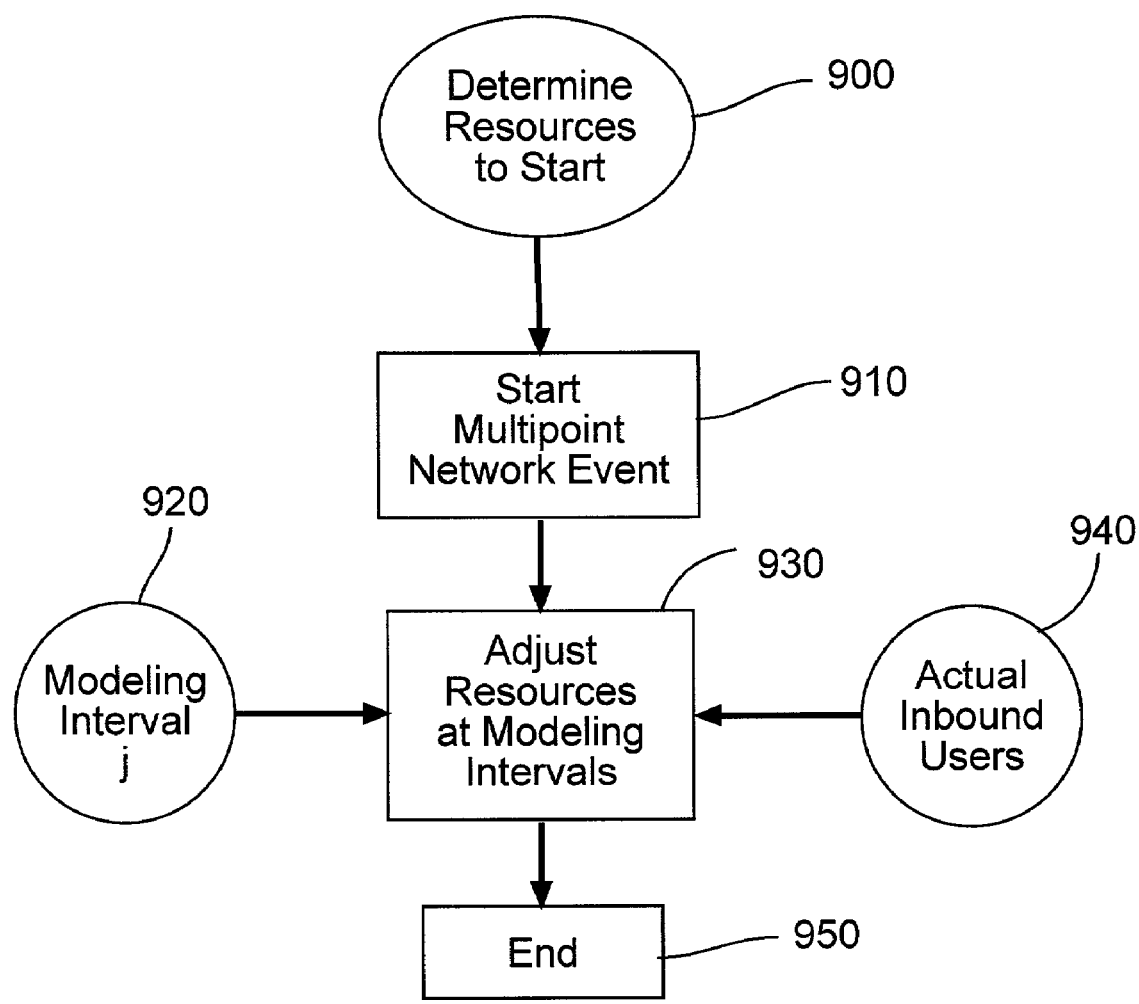
FIG. 9 is the dynamic adjusting process of the present invention.

The present invention as shown in FIG. 9 provides a method for dynamically allocating MCU resources during a multipoint network event by determining 900 a number of MCU resources to allocate the start 910 of the multipoint network event (Formula I). After starting 910 and at each of a plurality of modeling intervals (j) 920 during the multipoint event, adjusting 930 the number of allocated MCU resources based upon actual inbound users 940 in the multipoint network event (Formula II). This method of the present invention more efficiently utilizes MCU resources by generally allocating a lower number to start and then by continually adjusting that number based upon actual inbound users.

Figure 10:
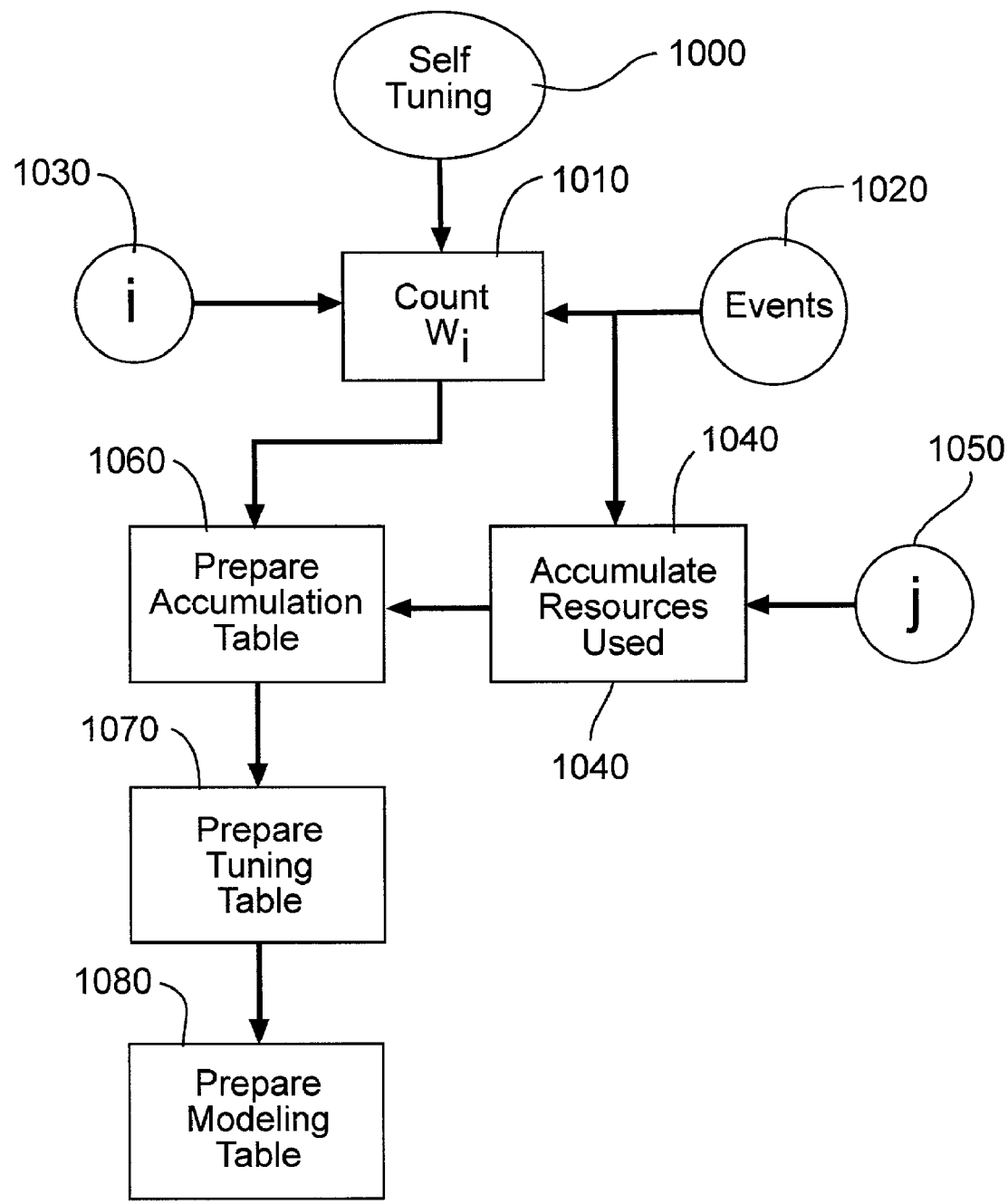
FIG. 10 is the self-tuning process of the present invention showing the preparation of the Accumulation, Tuning, and Modeling Tables.

A further method of the present invention is presented in FIG. 10 for self-tuning 1000 the allocation of MCU resources for multipoint events in advance of use thereby providing a look ahead allocation of MCU resources based on what is likely to be needed in the future for a conferencing event. This is accomplished by counting (w) 1010 the number of multipoint events 1020 that have been accumulated within at least one predetermined tuning interval 1030, and accumulating 1040 the number of MCU resources actually utilized during each multipoint event in each predetermined modeling interval. The Accumulation Table (FIG. 5) is prepared 1060 so as to determine the normalized resource allocations (Formula III) for preparation 1070 of the Tuning Table (FIG. 6). Finally, new probability values (Formula IV) are calculated and entered 1080 into the Modeling Table (FIG. 7). Then, determining a probability value (Formula IV) for future use of MCU resources for an upcoming multipoint event based on the steps of counting and accumulating (FIGS. 5, 6 and 7).

The above disclosure sets forth a number of embodiments of the present invention. Those skilled in this art will however appreciate that other arrangements or embodiments, not precisely set forth, could be practiced under the teachings of the present invention and that the scope of this invention should only be limited by the scope of the following claims.

We claim:

1. A method for allocating MCU ports for a multipoint network event, said method comprising:
receiving an allocation request for the multipoint network event, said request comprises a maximum number of MCU ports for the multipoint network event; and
determining electronically the number of MCU parts to allocate at the start of the multipoint network event, by calculating: $R=[(R_{MAX})(R_{SP})]_{R_{SM}}$, where R=number of ports to start, $R_{MAX}$=maximum ports, $R_{SP}$=configurable start port percentage, and $R_{SM}$=configurable minimum start ports, wherein the start MCU ports allocation number is less than or equal in value to the maximum MCU ports number.

2. The method of claim 1 wherein the allocation request is transmitted through a plurality of MCUs.

3. The method of claim 1 wherein the allocation request is transmitted through a common channel signaling interface.

4. The method of claim 1 wherein the step of receiving the allocation request originates as an external allocation request.

5. A method for time varying allocation of MCU ports during a multipoint network event, said method comprising:
determining the number of MCU ports to allocate for the start of the multipoint network event, by calculating: $R=[(R_{MAX})(R_{SP})]_{R_{SM}}$, where R=number of ports to start, $R_{MAX}$=maximum ports, $R_{SP}$=configurable start port percentage, and $R_{SM}$=configurable minimum start ports; and
at each of a plurality of modeling intervals during the multipoint network event, dynamically adjusting the number of allocated MCU ports based on users actually in the multipoint network event and based on a statistics algorithm using probability values related to future or historical use of MCU ports, wherein the probability values are dynamically modified.

6. The method of claim 5, wherein the step of adjusting comprises the step of calculating:

$$R_j = \left[\sum_{events}\left(\left(R_{actual} + \frac{Pj}{1-S}\right) \mid R_{\text{MAX}}\right)\right]\bigg|_{(\Sigma_{events} R_{actual})+1}$$

where:
$R_j$=Number of Ports at a modeling interval j of said plurality modeling intervals
$R_{actual}$=Number of Ports actually used
$R_{MAX}$=Maximum Ports
events=Number of multipoint network events
$P_j$=Probability Value at each of said plurality of modeling intervals j
S=Confidence Factor.

7. A method for allocating resources for a multipoint network event, said method comprising:
obtaining available MCU capacity in a plurality of MCUs;
receiving an allocation request from an allocation requestor for the multipoint network event;
determining the number of resources to allocate to start the multipoint network event, wherein said determination comprises calculating:
$R=[(R_{MAX})(R_{SP})]_{R_{SM}}$, where R=said number of resources to start, $R_{MAX}$=maximum resources, $R_{SP}$=configurable start resource percentage, and $R_{SM}$=configurable minimum start resources;
allocating the number of resources to at least one MCU;
debiting the allocated resources from the available MCU capacity; and
directing inbound users to the at least one MCU for participation in the multipoint network event.

8. The method of claim 7 wherein the allocation request is transmitted through a plurality of MCUs.

9. The method of claim 7 wherein the allocation request is transmitted through a common channel signaling interface.

10. The method of claim 7 wherein the step of receiving the allocation request originates as an external allocation request.

11. The method of claim 7 further comprising:
at each of a plurality of modeling intervals, dynamically adjusting the number of resources based on the number of inbound users actually in the multipoint network event and based on a statistics algorithm using probability values related to future or historical use of MCU capacity, wherein the probability values are dynamically modified.

12. The method of claim 11 wherein the step of adjusting comprises the step of calculating:

$$R_j = \left[\sum_{events}\left(\left(R_{actual} + \frac{P_j}{1-S}\right) \mid R_{MAX}\right)\right]\Bigg|_{(\Sigma_{events} R_{actual})+1}$$

where:
R$_j$=Number of Resources at a modeling interval j of said plurality modeling intervals
R$_{actual}$=Number of Resources actually used
R$_{MAX}$=Maximum Resources
events=Number of multipoint network events
P$_j$=Probability Value at each of said plurality of modeling intervals j
S=Confidence Factor.

13. The method of claim 12 wherein the step of adjusting adjusts the number of resources at each modeling interval (j) based on a configurable value for S.

14. The method of claim 12 wherein the step of adjusting adjusts the number of resources at each modeling interval (j) is based on a self-tuning value for P$_j$.

15. The method of claim 14 wherein the self-tuning value for P$_j$ comprises the step of calculating:

$$P_j = \frac{\sum_{i=1}^{m}(w_i)(\overline{R_{i,j}})}{\sum_{i=1}^{m} w_i}$$

where:

$$\overline{R_{i,j}} = \frac{R_j}{\sum_{j=1}^{n} R_j} = \text{normalized resource accumulation}$$

w$_i$=the counted number of events at tuning interval i
R$_j$=the number of resources that have become utilized during modeling interval j
n=the number of modeling intervals (j) in use
m=the number of tuning intervals (i) in use.

16. A method for allocating MCU ports for a plurality of multipoint network events, said method comprising:
obtaining available MCU capacity in a plurality of MCUs;
receiving allocation requests from allocation requestors for the plurality of multipoint network events;
determining based on each of said plurality of received allocation requests, the number of ports to allocate to start each of the multipoint network events, by calculating: $R=[(R_{MAX})(R_{SP})]_{R_{SM}}$, where R=number of ports to start. R$_{MAX}$=maximum ports, R$_{SP}$=configurable start port percentage, and R$_{SM}$=configurable minimum start ports;
allocating the number of ports to at least one MCU of said plurality of MCUs for each of the multipoint network events; and
at each of a plurality of modeling intervals during each multipoint network event, dynamically adjusting the number of ports based on inbound users actually in the multipoint network event and based on a statistics algorithm using probability values related to future or historical use of MCU ports, wherein the probability values are dynamically modified.

17. A method for tuning the allocation of MCU resources for multipoint network events, said method comprising:
counting the number of multipoint network events that have been accumulated within at least one predetermined tuning interval,
normalizing MCU resources actually utilized during each multipoint network event in each of the at least one predetermined tuning interval,
determining a probability value for future use of MCU resources for an upcoming multipoint network event based on the steps of counting and normalizing.

18. The method of claim 17 wherein the step of normalizing accumulates the number of resources at predetermined modeling intervals during each multipoint event.

19. The method of claim 17 wherein the predetermined tuning interval is at least three orders of magnitude in time greater than the predetermined modeling interval.

20. The method of claim 19 wherein the tuning interval is at least a day and the modeling interval is at least a minute.

21. The method of claim 6, wherein the value for P$_j$ comprises calculating:

$$P_J = \frac{\sum_{i=1}^{m}(w_i)(\overline{R_{i,j}})}{\sum_{i=1}^{m} w_i}$$

where:

$$\overline{R_{i,j}} = \frac{R_j}{\sum_{j=1}^{n} R_j} = \text{normalized resource accumulation}$$

w$_j$=the counted number of events at tuning interval i
R$_j$=the number of resources that have become utilized during modeling interval j
n=the number of modeling intervals (j) in use
m=the number of tuning intervals (i) in use.

* * * * *